(12) United States Patent
Faulkner (10) Patent No.: US 10,648,594 B1
(45) Date of Patent: May 12, 2020

(54) ADJUSTABLE VERTICAL SUPPORT FRAME

(71) Applicant: Richard Faulkner, Anchorage, AK (US)

(72) Inventor: Richard Faulkner, Anchorage, AK (US)

( * ) Notice: Subject to any disclaimer, the term of this patent is extended or adjusted under 35 U.S.C. 154(b) by 0 days.

(21) Appl. No.: 16/115,175

(22) Filed: Aug. 28, 2018

Related U.S. Application Data (60) Provisional application No. 62/553,275, filed on Sep. 1, 2017.

(51) Int. Cl.
*E04G 1/24* (2006.01)
*F16L 3/16* (2006.01)
*F16M 11/24* (2006.01)
*F16L 1/06* (2006.01)
*F16L 1/024* (2006.01)

(52) U.S. Cl.
CPC .............. *F16L 3/16* (2013.01); *F16L 1/0246* (2013.01); *F16L 1/06* (2013.01); *F16M 11/24* (2013.01)

(58) Field of Classification Search
CPC .. F16L 3/16; F16L 3/0246; F16L 3/06; F16M 11/24; E04G 2001/305; E04G 2001/242; E04G 3/00; E04G 1/00; E04G 21/3204
USPC ......... 248/59, 132, 235, 241, 161, 157, 422, 248/421, 423; 425/456, 119, 120; 182/141, 129, 147, 148, 149
See application file for complete search history.

(56) References Cited

U.S. PATENT DOCUMENTS

| | | | | |
|---|---|---|---|---|
| 228,518 A | * | 6/1880 | Dawes ..................... | A47B 9/04 108/147 |
| 281,494 A | * | 7/1883 | Groebl ................... | F16M 11/04 248/132 |
| 586,156 A | * | 7/1897 | Beal ........................ | F16M 11/24 248/157 |
| 734,763 A | * | 7/1903 | Smith ..................... | F16M 11/24 248/157 |
| 800,806 A | * | 10/1905 | King ........................ | B66F 11/04 182/141 |
| 805,524 A | * | 11/1905 | Bryant ................... | F16M 11/24 248/157 |
| 831,994 A | * | 9/1906 | Rudman ................... | B66F 3/02 254/95 |
| 1,324,560 A | * | 12/1919 | Leatherman et al. . | B25H 3/028 312/249.1 |
| 2,237,543 A | * | 4/1941 | Berchem ................... | E04G 1/32 182/149 |
| 3,007,677 A | * | 11/1961 | Dalton ..................... | B60S 9/06 254/419 |
| 3,130,439 A | * | 4/1964 | Bovaird .................. | B05C 13/00 15/268 |
| 3,566,991 A | * | 3/1971 | Proulx ..................... | E04G 1/20 182/129 |
| 4,412,803 A | * | 11/1983 | Allen ...................... | E01C 19/40 404/119 |

(Continued)

*Primary Examiner* — Nkeisha Smith
(74) *Attorney, Agent, or Firm* — Michael J. Tavella (57) ABSTRACT

An adjustable Vertical Support Member (VSM) that can be raised or lowered by turning a crank. Each VSM consists of a outer frame that has a base, and an inner frame that is adjustably positioned within the outer frame. A crank system is provided to lift (or lower) the inner frame as needed to restore the pipe to its original position. In this way, a pipeline can be set easily over varied terrain or, for operational reasons, at different heights, without equipment or large crews.

10 Claims, 8 Drawing Sheets

(56) References Cited

U.S. PATENT DOCUMENTS

| | | | | |
|---|---|---|---|---|
| 5,934,626 | A * | 8/1999 | Collins, Jr. | B23K 37/0538 248/132 |
| 6,026,932 | A * | 2/2000 | Comp | E04G 3/26 182/150 |
| 6,709,194 | B1 * | 3/2004 | Grimes | E04F 21/05 248/125.1 |
| 6,886,662 | B2 * | 5/2005 | Riley | E04G 3/22 182/82 |
| 7,828,116 | B2 * | 11/2010 | Vetesnik | A62B 1/04 182/115 |
| 8,602,377 | B2 * | 12/2013 | Chiu | F16M 11/18 248/297.31 |
| 8,662,252 | B2 * | 3/2014 | Ogden | E04G 1/02 182/107 |
| 9,150,231 | B2 * | 10/2015 | De Jong | B65G 1/04 |
| 10,149,456 | B2 * | 12/2018 | Diamond | A01K 5/0114 |
| 10,322,475 | B2 * | 6/2019 | Collins, Jr. | B23K 37/0538 |
| 2010/0012430 | A1 * | 1/2010 | Ogden | E04G 1/02 182/141 |
| 2010/0301186 | A1 * | 12/2010 | Chuang | A47B 9/00 248/422 |
| 2011/0041267 | A1 * | 2/2011 | Sun | B66F 7/0633 14/77.1 |
| 2014/0035245 | A1 * | 2/2014 | De Jong | B65G 1/04 280/79.3 |
| 2015/0308615 | A1 * | 10/2015 | Neaves | A01K 5/0114 119/61.57 |

* cited by examiner

ADJUSTABLE VERTICAL SUPPORT FRAME

CROSS REFERENCE TO RELATED APPLICATIONS

This application claims benefit of Provisional application 62/553,275 filed Sep. 1, 2017.

STATEMENT REGARDING FEDERALLY SPONSORED RESEARCH AND DEVELOPMENT

Not Applicable

BACKGROUND OF THE INVENTION

1. Field of the Invention

This invention relates to vertical support frames for pipelines and particularly to adjustable vertical support frames for pipelines.

2. Description of the Prior Art

Figure 1:
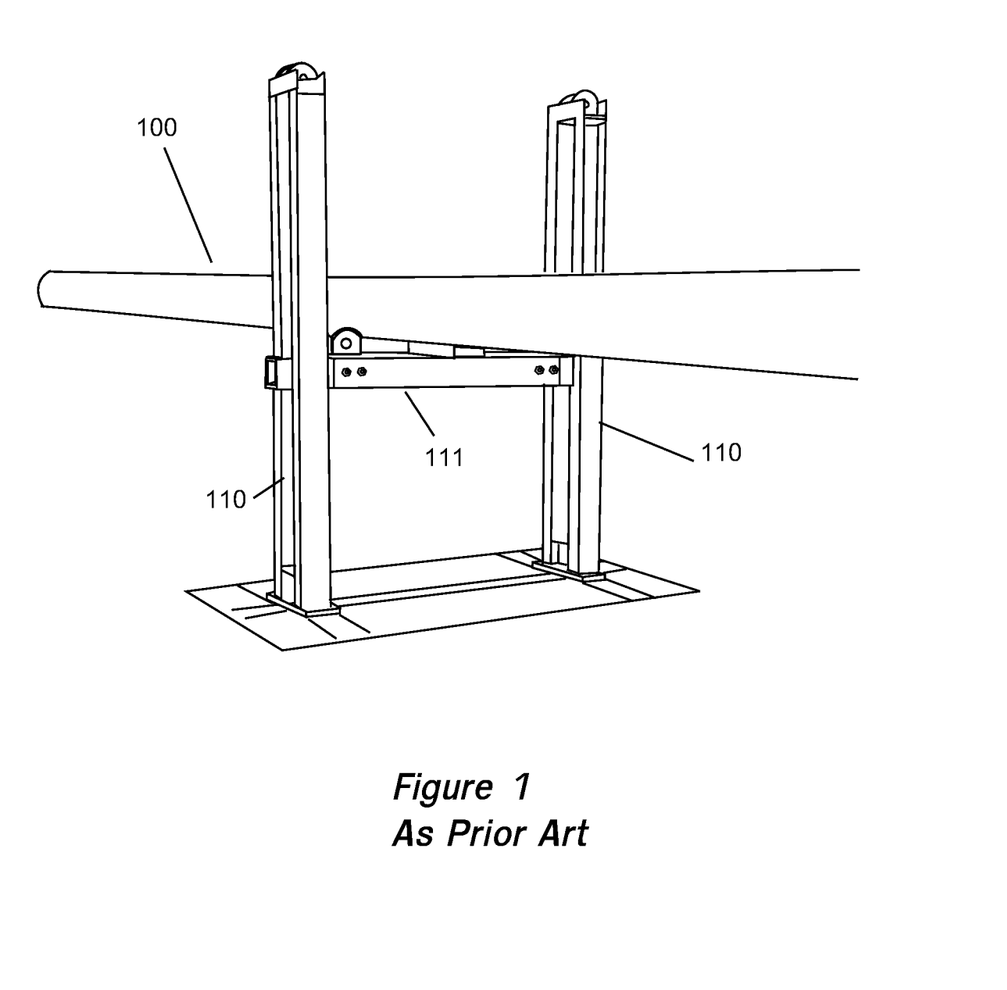
FIG. 1 is a perspective view of a VSM carrying a length of pipe as prior art.

Today pipelines are used to carry many things from crude oil to chemicals. Pipelines are also used at many facilities such as refineries and chemical plants. Many pipelines are built to run above grounds. These above ground pipelines are typically supported by vertical support members (VSMs). FIG. 1 is a perspective view of a prior art VSM carrying a length of pipe 100. A typical VSM, such as the one shown in FIG. 1, has an "H" shape with two vertical members 110 connected by a horizontal bridge 111. Overtime, the ground below a pipeline may subside or uplift. Pipelines may also have to be raised or lowered due to changes at a facility. When this occurs, the pipeline is no longer properly supported as the VSMs are no longer in their original positions. Currently, when this happens, the VSMs must be reset. Typically this involves using a crane to lift and support the pipe 100 off the horizontal member 111. Once the pipe is lifted, crews then raise or lower the VSM's horizontal member to a new level. Raising a VSM can involve jacking the VSM up to its original position and providing new support beneath it (if it has subsided). If the VSM must be lowered, it is possible to lower the horizontal member, or to excavate under the VSM as needed. Once the VSM is reset, the pipe can be lowered back to sit on the newly positioned VSM. Obviously, this type of operation requires a large crew and time to move the tools and equipment necessary for the job. Moreover, even for a small job it is expensive.

BRIEF DESCRIPTION OF THE INVENTION

The instant invention is an adjustable VSM that can be raised or lowered by turning a crank. There is no need for cranes or jacks or other tools. Each VSM consists of a outer frame that has a base, and an inner frame that is adjustably positioned within the outer frame, and a crank system that is used to lift (or lower) the inner frame as needed to restore the pipe to its original position. The device can have a "high" configuration or a "low" configuration, depending on the type of ground that VSM is placed on and on the particular needs of a run or pipe. The device is also fully adjustable so that within the "high" and "low" configurations, a number of different heights can be reached simply by cranking the support up or down. It is possible to use both types of VSMs in a given run of pipe. The main point is that in either case, the VSM is adjustable so that changing the height of the pipe at any given location is simple and easy. Moreover, because these operations require a much smaller crew and have no need for cranes or other lifting equipment, the job is far more economical over the prior art systems discussed above.

DETAILED DESCRIPTION OF THE INVENTION

Figure 2:
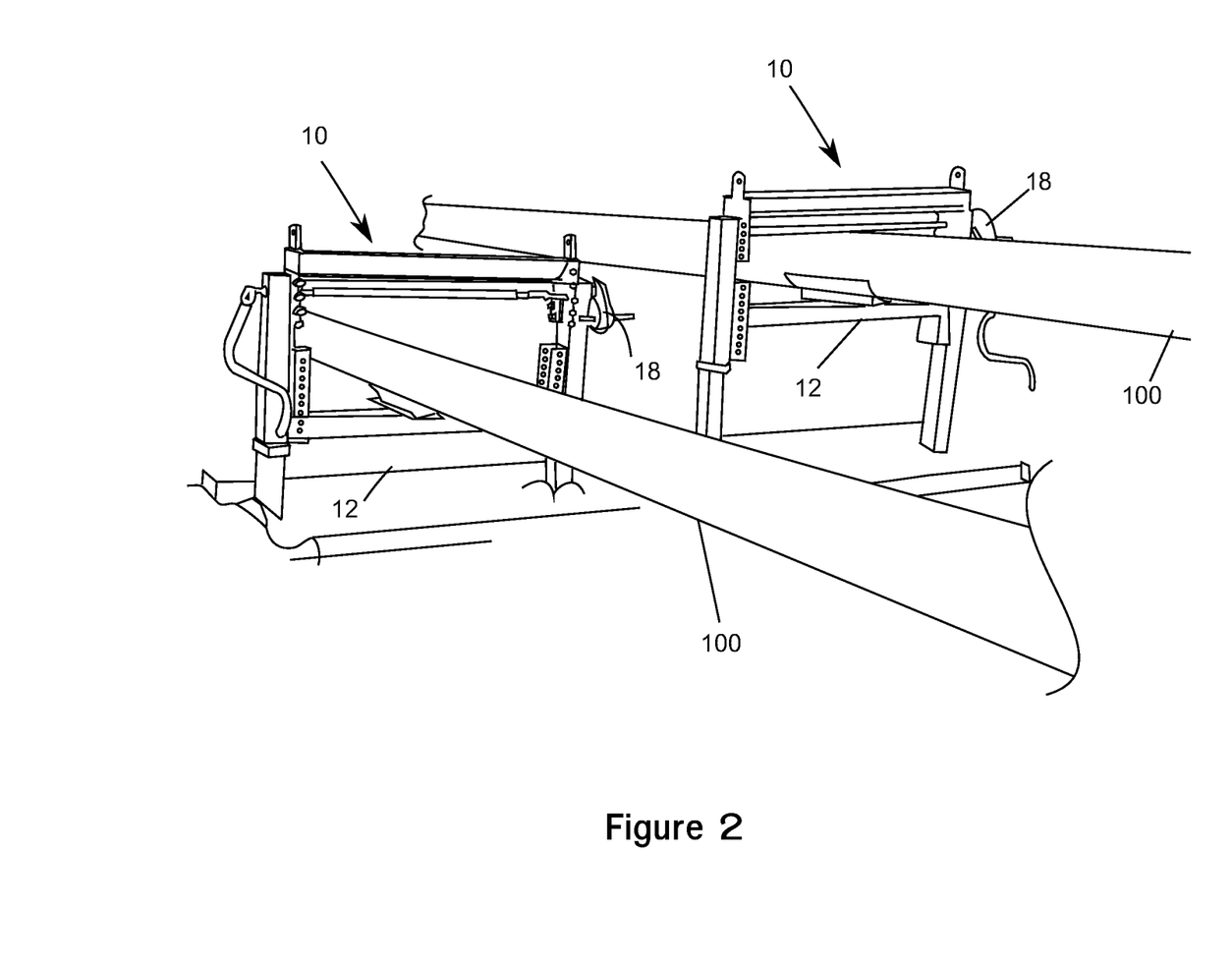
FIG. 2 is a perspective view of two VSMs of the instant invention, shown in the field carrying two different lengths of pipe.

Referring now to the drawings, FIG. 2 is an illustration of the invention in the field. Note, in this view two different pipes 100 are being supported by two new VSMs 10. Note that the pipe on the left is sitting lower than the pipe on the right. This is done or allow for the terrain (the left unit is lower than the right unit). The height differential is also caused by the routing of the pipes. Note too, that this height differential is accomplished by turning the crank mechanism 18 on the side of the VSMs, which causes the horizontal member 12 (see below) to move up or down. In this way, a pipeline can be set easily over varied terrain or, for operational reasons, at different heights, without equipment or large crews. It is also easy to adjust the height of pipes if the units settle, or if there is an upsurge in the ground. All of this is accomplished without large crews or heavy equipment (once the units are placed). Even placing the units can be done with a small loader with forks. Thus, the units provide a simple easy mechanism for dealing with pipeline construction that saves time, labor, equipment and money.

Figure 3:
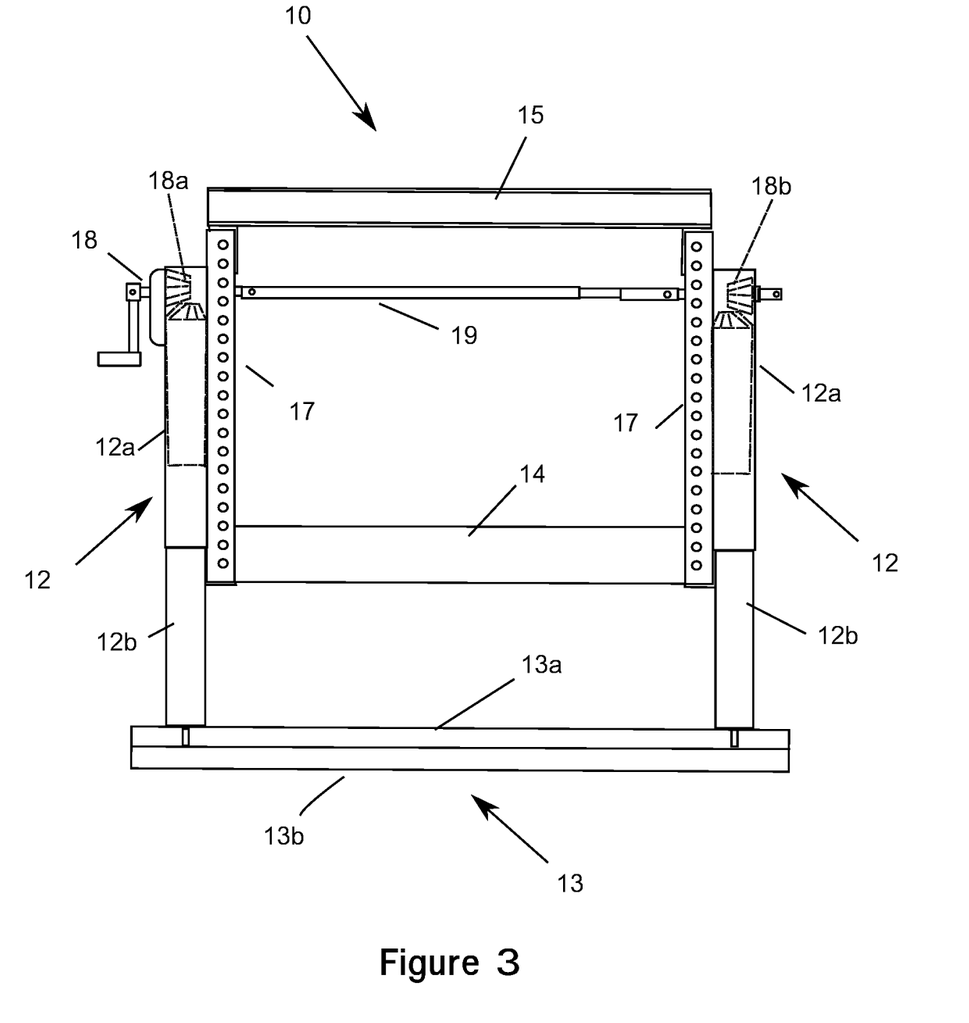
FIG. 3 is front view of the preferred embodiment. This figures shows the "high" configuration.

FIG. 3 is front view of the preferred embodiment. As noted above, the invention has a high configuration and a "low configuration. This figures shows the "high" configuration. The front view of the stand 10 is shown slightly extended. The stand has a lower frame 11 that has two end members 12 that have two parts—an upper portion 12a and a lower portion 12b, and a base 13. The base 13 has a top member 13a that is attached to the end frames and a bottom member 13b that is attached to the top member 13a. As an option, the side view (FIG. 4) also shows fork pockets 13c.

The two end members contain two screw jacks that are raised and lowered by the crank mechanism 18. The crank mechanism 18 is connected to the two screw jacks by a drive shaft 19. This mechanism is similar to that used in tractor trailer landing gear and is considered to be a jacking system.

The two screw jack mechanisms 18a and 18b are shown inside the vertical members in dashed lines.

A load support 14 is positioned between the two end members 12 as shown. The load support 14 is attached to angle irons 17, which are then attached to the side members 12a. The load support is used to carry whatever load (e. g., a pipe) is on the VSM.

Figure 5:
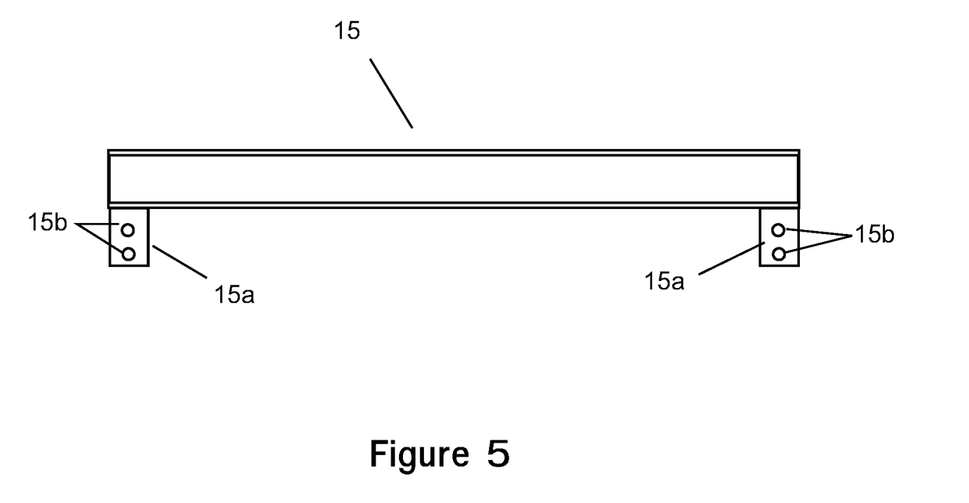
FIG. 5 is a detail front view of the racking beam.
Figure 6:
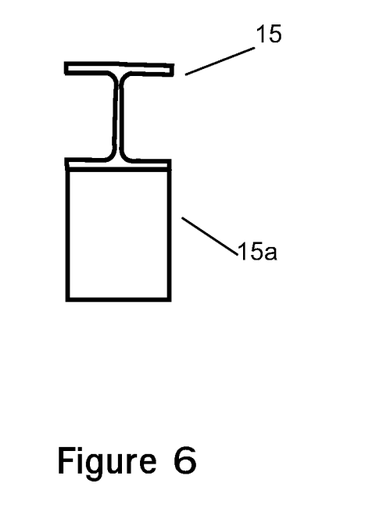
FIG. 6 is a detail side view of the racking beam.

At the top of the angle irons 17 is a racking beam 15, which provides stability for the unit. As shown in FIGS. 5 and 6, the racking beam 15 is an "I" beam that is welded or otherwise attached to two boxes 15a. The two boxes have holes 15b as shown that allow the racking beam to be bolted to the angle irons 17.

The angle irons 17 can be attached to the end members 12-bolted if they are to be removable, or welded, if not.

In the lower configuration, the top of the load support is approximately at 36 inches high. The angle irons stick up above the shield beam approximately 41 inches. In the extended mode, the load support is raised to a height of approximately 55 inches. In that mode, the racking beam is then at the full height of 96 inches.

Figure 4:
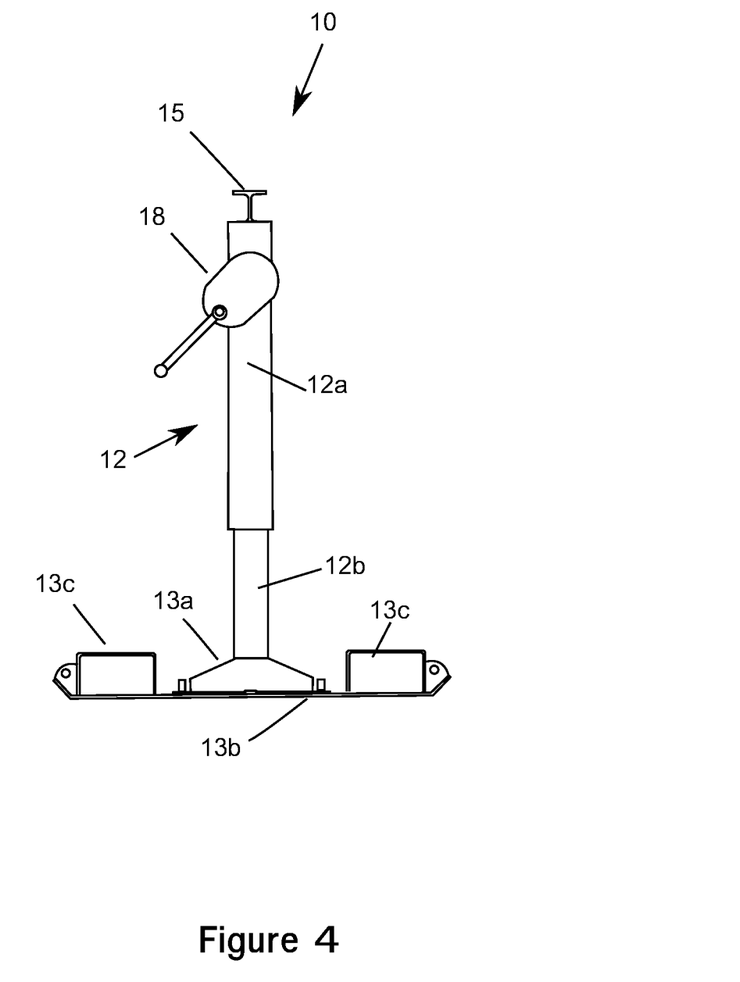
FIG. 4 is a side view of the preferred embodiment (high configuration).

FIG. 4 is a side view of the preferred embodiment (high configuration). Here, some additional details of the base 13 are shown. Note how the top member 13a of the base 13 is attached to the end frames 12 and to the bottom member 13b. In the preferred embodiment, fork pockets 13c are provided as well—although they can be optional. This figure also shows the crank mechanism 18.

As noted above, FIG. 5 is a detail front view and FIG. 6 is a detail side view of the racking beam 15. FIG. 5 shows the boxes 15a that are used to bolt the racking beam to the angle irons and FIG. 6 shows that the racking beam is an "I" beam, in the preferred embodiment.

Figure 7:
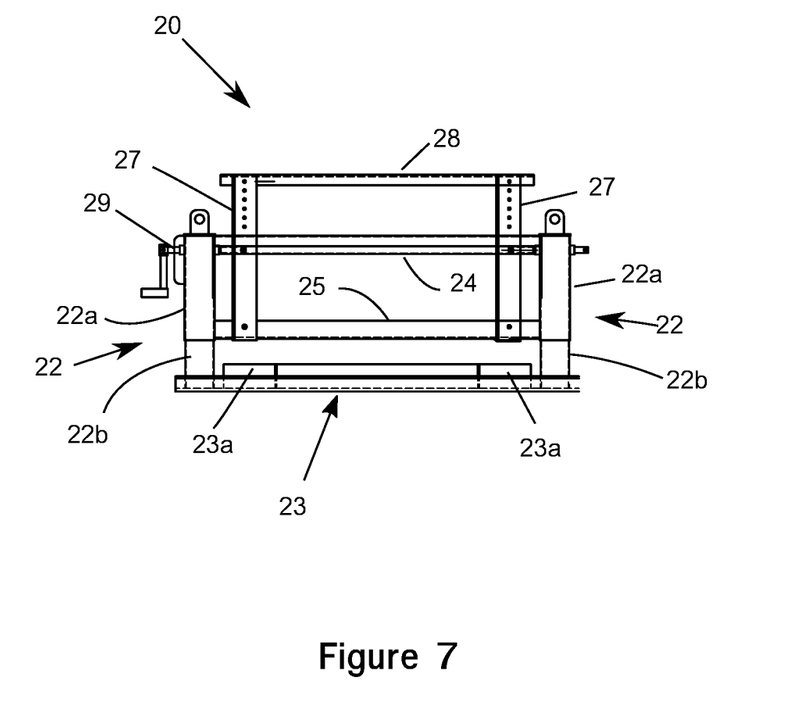
FIG. 7 is a front view of the preferred embodiment. This figures shows the "low" configuration.

FIG. 7 is a front view of the preferred embodiment in the "low" configuration 20. This mechanism is similar to that of the "high" configuration except that is built lower. There are times, because of terrain or the placement of the pipes, where the "high" unit cannot be lowered enough to be used. This is when the low unit of FIG. 7 is needed. As before, this configuration has a base 23 with fork pockets 23a. Two vertical frame assemblies 22 are shown. These have an upper portion 22a and a lower portion 22b as shown. A load support 25 is attached to the upper portions 22a of the vertical frame assemblies. As before, angle irons 27 are used connect the load support 25 to the top plate 28. Unlike the "high" configuration, the "low" configuration has a flat plate on top. A drive shaft 24 is shown attached to the crank mechanism 29 as shown. In this configuration the top plate 28 is positioned the top of the angle irons.

Figure 8:
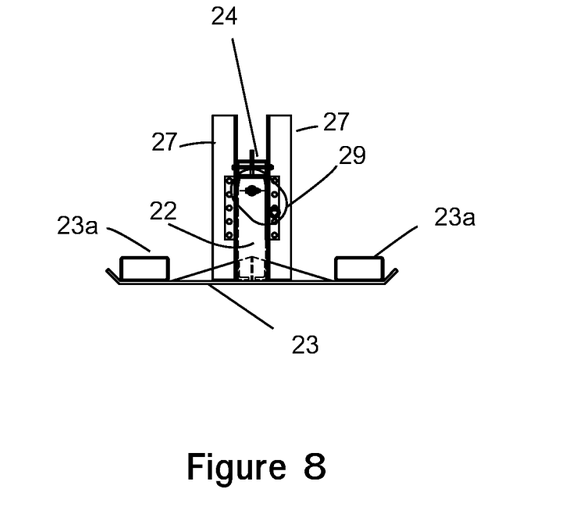
FIG. 8 is a side view of the preferred embodiment (low configuration).
Figure 9:
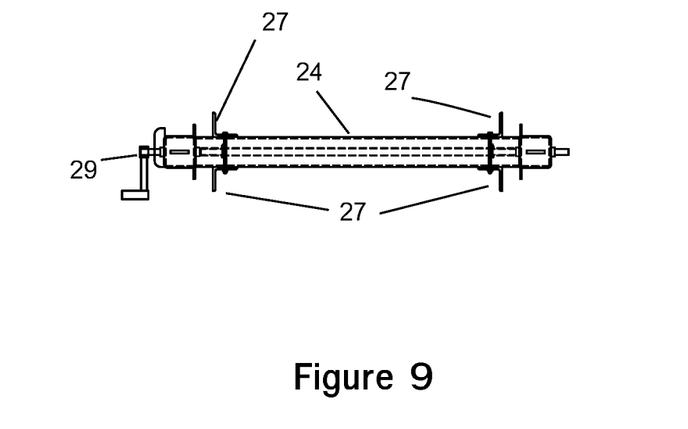
FIG. 9 is a top view of the preferred embodiment.

FIGS. 8 and 9 are a side view of the preferred embodiment a top view of the preferred embodiment (low configuration) respectively. Note that FIG. 8 shows the device fully cranked down. Note that in carrying loads, pipes, for example, can be placed on the top racking support, or the load supports as desired. In this way, the device offers great flexibility to the user.

Figure 10:
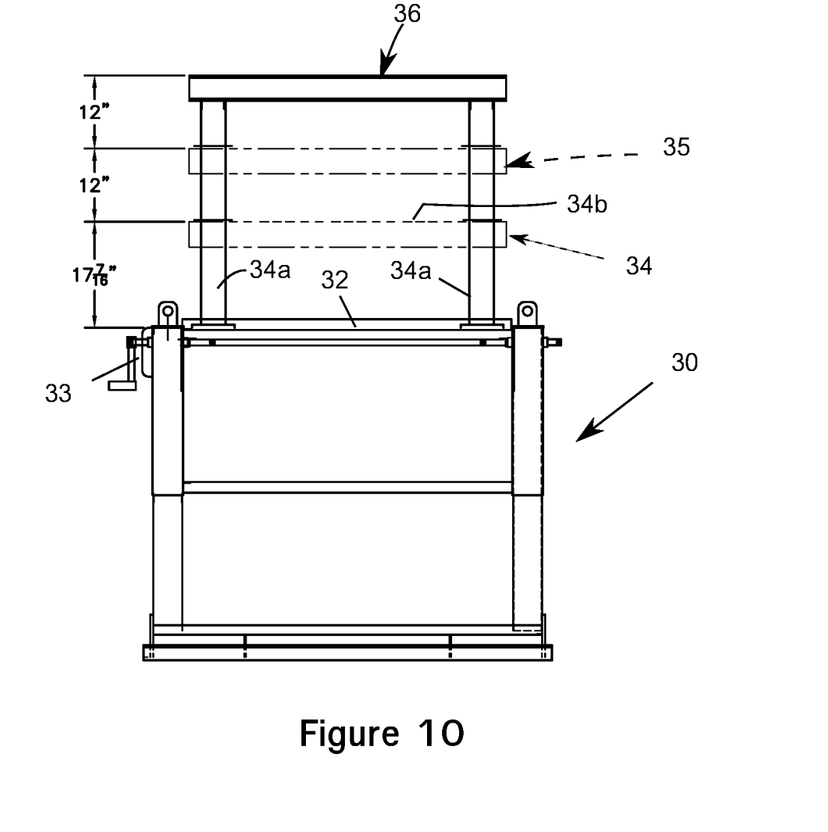
FIG. 10 is a front view of a second embodiment (high configuration).

FIG. 10 is a front view of a second embodiment (high configuration) pipe stand that uses 3 fixed riser frames. In this embodiment, the angle irons 17 are not used. The lower frame 30 is the same as that described for FIG. 3. However, the vertical frames 31 are now attached to a shield beam 32. The lower frame crank 33 raises the shield beam from a low of 36 inches to a high of 54.9 inches. Additional riser frames 34, 35, and 36 can be attached to the shield beam as desired. Each of these riser frames has two legs and a top beam as shown. For example, frame 34 has two legs 34a and the beam 34b. The lower frame 34 has a rise of 17⅞ inches. The other frames 35 and 36 have a rise of 12 inches each. Thus, with the lower frame at full height, and the addition of riser frame 34, the height of the VSM is 72 inches. The other frames each raise the height by 12 inches each, so that with all three frames, 34, 35, and 36, the maximum height is 96 inches.

Figure 11:
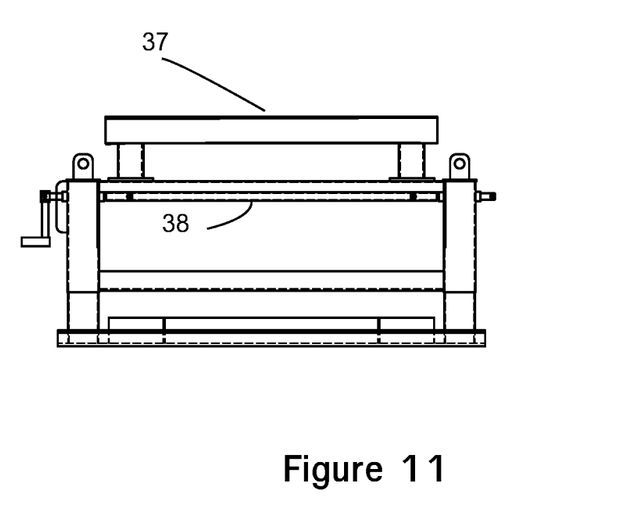
FIG. 11 is a front view of a second embodiment (low configuration).

FIG. 11 is a front view of a second embodiment (low configuration) pipe stand with a fixed riser frame. As above, in this embodiment, the angle irons are not used. The lower frame is the same as that described for FIG. 7. Unlike the "high" embodiment, only one riser frame 37 is now attached to the shield beam 38. The single riser frame 37 raises the height of the VSM over the shield beam by 10⅛ inches.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An adjustable vertical support frame, comprising:
   a) a lower frame that has a base, having a top member and two vertical end members extending upwardly from the top of said base;
   b) a screw jack system, operably attached to the two vertical end members and to a load support beam positioned between the two vertical end members; and
   c) at least one riser frame, said at least one riser frame having two vertical legs and a top beam, wherein said at least one riser frame is attached to said load support beam.

2. The adjustable vertical support frame of claim 1 further comprising:
   a) a pair of angle irons, each of said pair of angle irons having a top, attached to each of the two vertical end members; and
   b) a racking beam attached to the top of said pair of angle irons.

3. The adjustable vertical support frame of claim 2 wherein the racking beam further comprises:
   a) an "I" beam having a first end and a second end; and
   b) a pair of boxes, one of said pair of boxes being attached to the first end of said "I" beam and the other of said pair of boxes being attached to the second end of said "I" beam.

4. The adjustable vertical support frame of claim 1 wherein each of the two vertical end members has an upper portion and a lower portion, and further wherein said upper portion is telescopically fitted over said lower portion.

5. The adjustable vertical support frame of claim 1 wherein the base further comprises:
   a) the top member that is attached to the two vertical end members; and
   b) a bottom member that is attached to the top member.

6. The adjustable vertical support frame of claim 5 wherein the base further comprises:
   a pair of fork pockets, attached to the top member of the base.

7. The adjustable vertical support frame of claim 1 wherein the screw jack system further comprises:
   a) a pair of screw jacks, one of said pair of screw jacks being installed in each of said two vertical end members;

b) a drive shaft, operably attached to said pair of screw jacks; and c) a crank mechanism, operably attached to said drive shaft such that when said crank mechanism is turned, said drive shaft causes said screw jacks to operate.

8. The adjustable vertical support frame of claim 1 wherein the support frame has a "high" configuration.

9. The adjustable vertical support frame of claim 1 wherein the support frame has a "low" configuration.

10. The adjustable vertical support frame of claim 1 further comprising a pair of riser frames, each of said pair of riser frames having two vertical legs and a top beam and further wherein said pair of riser frames being stacked on said at least one riser frame.

* * * * *